(12) United States Patent
Hanlon

(10) Patent No.: US 6,576,362 B2
(45) Date of Patent: Jun. 10, 2003

(54) ELECTROCHEMICAL CELL SYSTEM

(75) Inventor: Greg A. Hanlon, Vernon, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 73 days.

(21) Appl. No.: 09/745,614

(22) Filed: Dec. 22, 2000

(65) Prior Publication Data

US 2001/0049034 A1 Dec. 6, 2001

Related U.S. Application Data

(60) Provisional application No. 60/171,369, filed on Dec. 22, 1999.

(51) Int. Cl.[7] ............. H01M 2/00; H01M 2/02; H01M 8/04; H01M 8/18; C25C 3/00
(52) U.S. Cl. ............. 429/34; 429/17; 429/21; 204/DIG. 4; 204/245
(58) Field of Search ............. 429/17, 21, 34; 204/DIG. 4, 245

(56) References Cited

U.S. PATENT DOCUMENTS

| | | | |
|---|---|---|---|
| 3,503,151 A | 3/1970 | White et al. | 46/243 |
| 3,507,704 A | 4/1970 | Webb | 136/86 |
| 3,992,271 A | 11/1976 | Danzig et al. | |
| 4,039,409 A | 8/1977 | LaConti et al. | |
| 4,209,591 A | 6/1980 | Hendriks | |
| 4,457,824 A | 7/1984 | Dempsey et al. | |
| 4,707,229 A | 11/1987 | Dempsey et al. | |
| 4,839,247 A * | 6/1989 | Levy et al. | 429/21 |
| 5,470,448 A | 11/1995 | Molter et al. | |
| 5,712,054 A | 1/1998 | Kejha | 429/21 |

* cited by examiner

Primary Examiner—Patrick Ryan
Assistant Examiner—Julian Mercado
(74) Attorney, Agent, or Firm—Cantor Colburn LLP

(57) ABSTRACT

An electrochemical cell system is disclosed, wherein at least one electrochemical cell is provided in a vessel. The electrochemical cells each include a membrane electrode assembly having a first electrode, a second electrode, and a membrane disposed between and in intimate contact with the first electrode and the second electrode. The vessel is disposed around the membrane electrode assembly. The vessel defines at least a portion of a first storage area that is in fluid communication with the first electrode. Further vessel defines at least a portion of a second storage area that is in fluid communication with the second electrode.

6 Claims, 4 Drawing Sheets

ELECTROCHEMICAL CELL SYSTEM

CROSS-REFERENCE TO RELATED APPLICATIONS

This application claims the benefit of the Provisional application Ser. No. 60/171,369 filed Dec. 22, 1999, which is hereby incorporated by reference.

TECHNICAL FIELD

The present disclosure relates to an electrochemical cell system, and especially relates to the use internal reactant and fluid storage areas in a fully integrated electrochemical cell.

BRIEF DESCRIPTION OF THE RELATED ART

Electrochemical cells are energy conversion devices, usually classified as either electrolysis cells or fuel cells. An electrolysis cell functions as a hydrogen generator by electrolytically decomposing water to produce hydrogen and oxygen gases, and functions as a fuel cell by electrochemically reacting hydrogen with oxygen to generate electricity.

Referring to FIG. 1, a partial section of a typical proton exchange membrane fuel cell 10 is detailed. In fuel cell 10, hydrogen gas 12 and reactant water 14 are introduced to a hydrogen electrode (anode) 16, while oxygen gas 18 is introduced to an oxygen electrode (cathode) 20. The hydrogen gas 12 for fuel cell operation can originate from a pure hydrogen source, methanol or other hydrogen source. Hydrogen gas electrochemically reacts at anode 16 to produce hydrogen ions (protons) and electrons, wherein the electrons flow of from anode 16 through an electrically connected external load 21, and the protons migrate through a membrane 22 to cathode 20. At cathode 20, the protons and electrons react with the oxygen gas to form resultant water 14', which additionally includes any reactant water 14 dragged through membrane 22 to cathode 20. The electrical potential across anode 16 and cathode 20 can be exploited to power an external load.

The same configuration as is depicted in FIG. 1 for a fuel cell is conventionally employed for electrolysis cells. In a typical anode feed water electrolysis cell (not shown), process water is fed into a cell on the side of theoxygen electrode (in an electrolytic cell, the anode) to form oxygen gas, electrons, and protons. The electrolytic reaction is facilitated by the positive terminal of a power source electrically connected to the anode and the negative terminal of the power source connected to a hydrogen electrode (in an electrolytic cell, the cathode). The oxygen gas and a portion of the process water exit the cell, while protons and water migrate across the proton exchange membrane to the cathode where hydrogen gas is formed. In a cathode feed electrolysis cell (not shown), process water is fed on the hydrogen electrode, and a portion of the water migrates from the cathode across the membrane to the anode where protons and oxygen gas are formed. A portion of the process water exits the cell at the cathode side without passing through the membrane. The protons migrate across the membrane to the cathode where hydrogen gas is formed.

The typical electrochemical cell system includes a number of individual cells arranged in a stack, with the working fluid directed through the cells via input and output conduits formed within the stack structure. The cells within the stack are sequentially arranged, each including a cathode, a proton exchange membrane, and an anode. In certain conventional arrangements, the anode, cathode, or both are gas diffusion electrodes that facilitate gas diffusion to the membrane. Each cathode/membrane/anode assembly (hereinafter "membrane electrode assembly", or "MEA") is typically supported on both sides by flow fields comprising screen packs or bipolar plates. Such flow fields facilitate fluid movement and membrane hydration and provide mechanical support for the MEA. Since a differential pressure often exists in the cells, compression pads or other compression means are often employed to maintain uniform compression in the cell active area, i.e., the electrodes, thereby maintaining intimate contact between flow fields and cell electrodes over long time periods.

Pumps are used to move the reactants and products to and from the electrochemical cell, which is connected to the liquid and gas storage devices by a system of pipes. This use of external pumps and storage areas both limits the ease with which electrochemical cells may be transported, and complicates the use of electrochemical cells in locations where pumps and storage tanks are difficult to introduce or operate.

While existing electrochemical cell systems are suitable for their intended purposes, there still remains a need for improvements, particularly regarding operation of electrochemical cell systems with minimal reliance on external pumps and storage units.

SUMMARY

The above-described drawbacks and disadvantages are alleviated by an electrochemical cell system comprising at least one electrochemical cell provided in a vessel. The electrochemical cells each include a membrane electrode assembly having a first electrode, a second electrode, and a membrane disposed between and in intimate contact with the first electrode and the second electrode. The vessel is disposed around the membrane electrode assembly. The vessel defines at least a portion of a first storage area that is in fluid communication with the first electrode. Further vessel defines at least a portion of a second storage area that is in fluid communication with the second electrode.

BRIEF DESCRIPTION OF THE DRAWINGS

Referring now to the drawings, which are meant to be exemplary and not limiting, and wherein like elements are numbered alike in the several Figures.

DETAILED DESCRIPTION OF THE PREFERRED EMBODIMENTS

The electrochemical cell system described herein has one or more electrochemical cells provided in a vessel. Each electrochemical cell includes a membrane electrode assembly having a first electrode, a second electrode, and a membrane disposed between and in intimate contact with the first electrode and the second electrode. The vessel is disposed around the membrane electrode assembly. The vessel defines at least a portion of a first storage area that is in fluid communication with the first electrode and at least a portion of a second storage area that is in fluid communication with the second electrode. In various preferred embodiments, one or both of the storage areas further comprise at least a portion of one or both flow fields that may surround the electrodes of the membrane electrode assembly.

It should be noted that although this disclosure is directed to a proton exchange membrane electrochemical cell employing hydrogen, oxygen, and water, it is readily understood that all types of electrochemical cells can be employed. Additionally, all types of electrolytes may be used, including, but not limited to the following: phosphoric acid, solid oxide, and potassium hydroxide, and the like. Various reactants can also be used, including, but not limited to, the following: hydrogen bromine, oxygen, air, chlorine, and iodine. Upon the application of different reactants and/or different electrolytes, the flows and reactions are understood to change accordingly, as is commonly understood in relation to that particular type of electrochemical cell.

Figure 1:
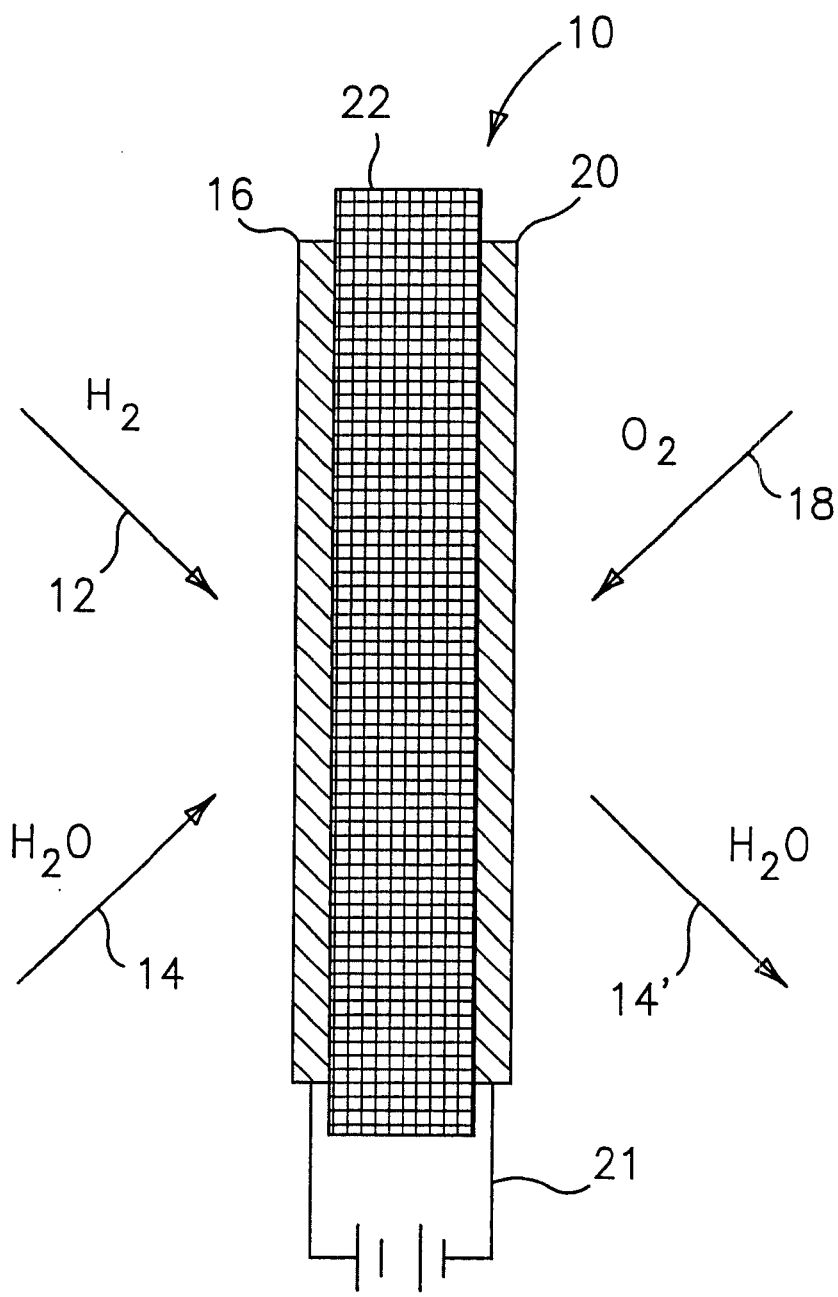
FIG. 1 is a schematic diagram of a prior art electrochemical cell showing an electrochemical reaction.
Figure 2:
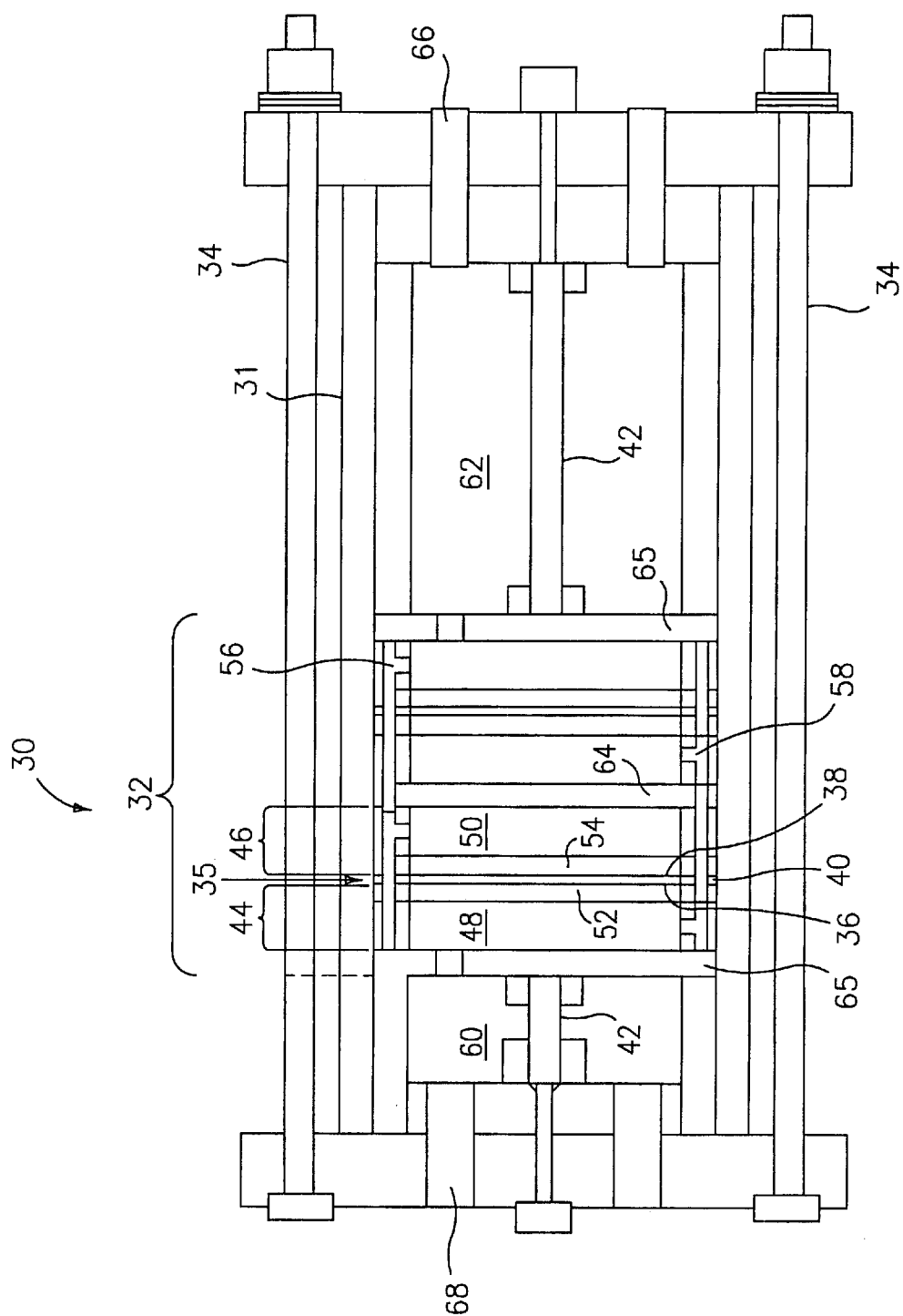
FIG. 2 is a cross sectional view of an electrochemical system.

Referring to FIG. 2, an electrochemical cell system 30 includes a vessel 31 that encloses an electrochemical cell stack 32. The cell stack 32 comprises one or multiple electrochemical cells and is maintained in position within the vessel 30 using conventional devices such as tie rods, truss rods, bolts, or other devices 34. Each electrochemical cell comprises a MEA 35, with each MEA 35 comprising an oxygen electrode 36 and a hydrogen electrode 38 with a proton exchange membrane (electrolyte) 40 disposed therebetween. The materials for the MEA 35 can comprise any conventional membrane electrode assembly materials.

The membrane 40 can be of any material typically employed for forming the membrane in electrochemical cells. The electrolytes are preferably solids or gels under the operating conditions of the electrochemical cell. Useful materials include proton conducting ionomers and ion exchange resins. Exemplary, proton conducting ionomers comprise complexes of an alkali metal, alkali earth metal salt, or a protonic acid with one or more polar polymers such as a polyether, polyester, or polyimide, or complexes of an alkali metal, alkali earth metal salt, or a protonic acid with a network or crosslinked polymer containing the above polar polymer as a segment. Useful polyethers include polyoxyalkylenes, such as polyethylene glycol, polyethylene glycol monoether, polyethylene glycol diether, polypropylene glycol, polypropylene glycol monoether, and polypropylene glycol diether, and the like; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether, and the like; condensation products of ethylenediamine with the above polyoxyalkylenes; esters, such as phosphoric acid esters, aliphatic carboxylic acid esters or aromatic carboxylic acid esters of the above polyoxyalkylenes; as well as combinations comprising at least one of the foregoing. Copolymers of, e.g., polyethylene glycol with dialkylsiloxanes, polyethylene glycol with maleic anhydride, or polyethylene glycol monoethyl ether with methacrylic acid are known in the art to exhibit sufficient ionic conductivity to be useful. Useful complex-forming reagents can include alkali metal salts, alkali metal earth salts, and protonic acids and protonic acid salts, as well as combinations comprising at least one of the foregoing. Counterions useful in the above salts can be halogen ion, perchloric ion, thiocyanate ion, trifluoromethane sulfonic ion, borofluoric ion, and the like, as well as combinations comprising at least one of the foregoing. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, tetrafluoroethylene sulfonic acid, hexafluorobutane sulfonic acid, and the like, as well as combinations comprising at least one of the foregoing.

Ion-exchange resins useful as proton conducting materials include hydrocarbon- and fluorocarbon-type resins. Hydrocarbon-type ion-exchange resins can include phenolic or sulfonic acid-type resins; condensation resins such as phenol formaldehyde, polystyrene, styrene-divinyl benzene copolymers, styrene-butadiene copolymers, styrene-divinylbenzene-vinylchloride terpolymers, and the like, as well as combinations comprising as least one of the foregoing, that are imbued with cation-exchange ability by sulfonation, or are imbued with anion-exchange ability by chloromethylation followed by conversion to the corresponding quaternary amine.

Fluorocarbon-type ion-exchange resins can include hydrates of a tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is the NAFION® resins (DuPont Chemicals, Wilmington, Del).

The electrodes 36, 38 can be conventional electrodes comprising materials such as platinum, palladium, rhodium, iridium, ruthenium, osmium, carbon, gold, tantalum, tin, indium, nickel, tungsten, manganese, and the like, as well as mixtures, oxides, alloys, and combinations comprising at least one of the foregoing materials. Additional possible catalysts which can be used alone or in combination with the above include graphite and organometallics, such as pthalocyanines and porphyrins, and combinations comprising at least one of the foregoing catalysts, and the like. Some possible catalysts are disclosed in U.S. Pat. Nos. 3,992,271, 4,039,409, 4,209,591, 4,707,229, and 4,457,824, which are incorporated herein by reference. This catalyst can comprise discrete catalyst particles, hydrated ionomer solids, fluorocarbon, other binder materials, other materials conventionally utilized with electrochemical cell catalysts, and combinations comprising at least one of the foregoing. Useful ionomer solids can be any swollen (i.e., partially disassociated polymeric material) proton and water conducting material. Possible ionomer solids include those having a hydrocarbon backbone, and perfluoroionomers, such as perfluorosulfonate ionomers (which have a fluorocarbon backbone). Ionomer solids and catalysts therewith are further described in U.S. Pat. No. 5,470,448 to Molter et al., which is incorporated herein by reference.

In order to allow transport of the electrons, the electrodes electrically connect to a load and/or power source via an electrical connection 42. The electrical connection 42 can comprise any conventional electrical connector such as wires, a truss/buss rod, buss bar, cables, combination comprising at least one of the foregoing, or another electrical connector. Some possible materials include copper, other metals, and mixtures and alloys thereof.

The MEA 35 is in fluid communication with an oxygen flow field 44 on the oxygen side and a hydrogen flow field 46 on the hydrogen side of the cell 32. Flow fields 44, 46 each may comprise a cell storage area 48, 50, respectively, and also may comprise a support structure 52, 54, respectively. The cell storage areas, of which either or both are optional, are generally configured for storing the respective system fluids, and optionally configured for allowing passage of the electrical connection 42.

The support structures 52, 54 may comprise one or more materials that are porous and also electrically conductive. The porous, electrically conductive material is capable of providing structural integrity for supporting the MEA 35, allowing passage of system fluids to and from the appropriate electrodes 36 or 38, and conducting electrical current to and from the appropriate electrodes 36 or 38. The porous, electrically conductive materials on opposite sides of the MEA 35 may each may comprise one or more layers of perforated or porous sheets, expanded metal, sintered metal particles, fabrics (woven or felt), polymers (e.g., electrically conductive, particulate-filled polymers), ceramics (e.g., electrically conductive, particulate-filled ceramics), or a woven mesh formed from metal or strands, as well as combinations comprising at least one of the foregoing layers. The sheets can have any cross-section, e.g. rectangular, square, octagonal, hexagonal, or other multi-sided geometry.

The porous materials are typically composed of electrically conductive material compatible with the electrochemical cell environment (for example, the desired pressures, preferably up to or exceeding about 10,000 psi, temperatures up to about 250° C., and exposure to hydrogen, oxygen, and water). Some possible materials include carbon, nickel and nickel alloys (e.g., Hastelloy®, which is commercially available from Haynes International, Kokomo, Ind., Inconel®, which is commercially available from INCO Alloys International Inc., Huntington, W. Va., among others), cobalt and cobalt alloys (e.g., MP35N®, which is commercially available from Maryland Specialty Wire, Inc., Rye, N.Y., Haynes 25, which is commercially available from Haynes International, Elgiloy®, which is commercially available from Elgiloy® Limited Partnership, Elgin, Ill., among others), titanium, zirconium, niobium, tungsten, carbon, hafnium, iron and iron alloys (e.g., steels such as stainless steel and the like), among others, and oxides, mixtures, and alloys comprising at least one of the foregoing materials, with steels, nickel, titanium, and alloys comprising at least one of the foregoing preferred. The particular porous conductive material employed is dependent upon the particular operating conditions on that side of the membrane electrode assembly. In a proton exchange membrane fuel cell, for example, the oxygen side screen pack can additionally store water. The geometry of the openings in the porous materials can range from ovals, circles and hexagons to diamonds and other elongated shapes.

The electrochemical cell system 30 further comprises an oxygen fluid port 58 and a hydrogen fluid port 56. The oxygen fluid port 56 provides fluid communication between a system oxygen storage area 60 and the oxygen flow field 44, and the hydrogen fluid port 56 provides fluid communication between a system hydrogen storage area 62 and the hydrogen flow field 46. A cell stack 32's oxygen and hydrogen volumetric capacities are, therefore, generally based upon the combined volume of the appropriate system storage area 60, 62 respectively, and the cell storage area 48, 50 respectively. Fluid communication between adjacent cells is prevented by a separator 64. Further, fluid communication between the cell stack 32 and the storage areas 60, 62 (other than through the fluid ports 56 and 58) is prevented by stack endplates 65, which may comprise materials similar to support structures 52, 54.

The vessel 31 may optionally comprise external ports (not shown) for fluid storage tanks (not shown). The external vessels allow for longer operation and/or greater product storage capacity.

The system storage areas 60, 62 preferably comprise a sufficient capacity to hold the desired amount of fluids for the given application. That is, the storage areas hold the maximum amount of fluid that will be produced during the electrolysis operation. Optionally, the hydrogen produced hereby can be stored as high-pressure gas, or alternatively, in a solid form, such as a metal hydride, a carbon based storage (e.g. particulates, nanofibers, nanotubes, or the like), or others, and combinations comprising at least one of the foregoing storage mediums. The use of solid hydrogen storage allows for a reduction in the system storage area 62, which thereby allows for an overall reduction in the size of the electrochemical cell system 30.

During the energy storage cycle of the system, oxygen (and any excess water) is stored in the system storage area 60 and optionally in the cell storage area 48 while the hydrogen is stored in system storage area 62 and optionally the cell storage area 50. In the energy production cycle of the system, water (and any excess oxygen) may be stored in system storage area 60 and optionally in the cell storage area 48, and preferably substantially in the cell storage area 48. Excess hydrogen is stored in the system storage area 62 and optionally the cell storage area 50.

The electrochemical cell system 30 can be initially charged by an external power source. The system 30 is operating as an electrolyzer in this stage, and water (or other liquid reactant such as hydrogen bromide) is separated for example, into hydrogen and oxygen. The hydrogen and oxygen are stored in their respective system storage areas 62, 60, within the vessel 31 and optionally in the cell storage areas 50, 48, and, after reaching an operating pressure, charge secures automatically. That is, the external power source can be disconnected and an electrical load can be attached to the charged system. The system can then operate as a fuel cell, recombining the hydrogen and oxygen into water, while producing an electrical current. When current production ceases or reaches a predetermined level, the system is regenerated by again charging with an external power source such as a photovoltaic cell or other power source.

EXAMPLE

The following example illustrates a specific electrochemical cell system as disclosed herein. It should be understood that the examples are given for the purpose of illustration and are not intended as limitations.

Figure 3:
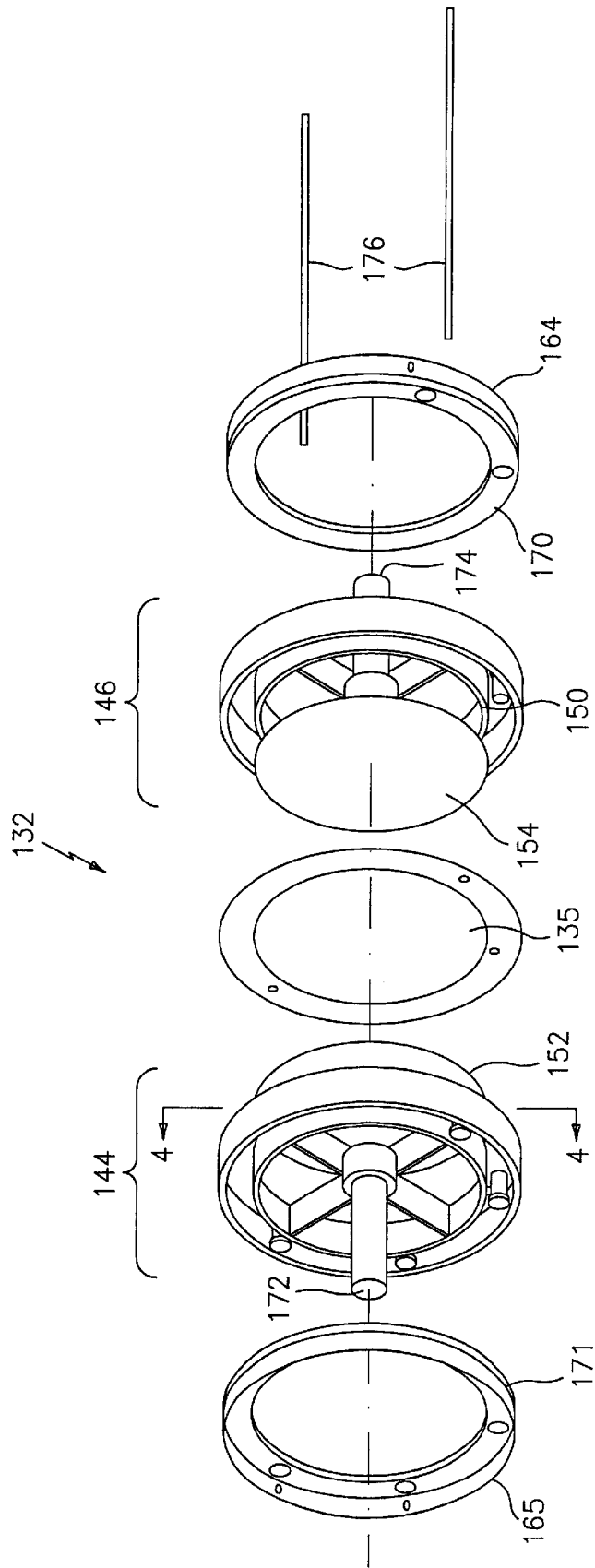
FIG. 3 is an exploded isometric view of a cell assembly.

Referring now to FIGS. 2 and 3, an exemplary cell 132 having surrounding components is depicted. A total of seven (7) cells similar to cell 132 were employed in an electrochemical cell system having the configuration of the electrochemical cell system 30. The electrochemical cell system was employed within a cylindrical polycarbonate vessel (similar to the vessel 31) having a height of 11.458 inches (29.103 centimeters, "cm"), an internal diameter of 4 inches (10.16 cm), and an outer diameter of 4.6 inches (11.684 cm). The cell 132 comprised a MEA 135 having a membrane formed of Nafion® 117. The MEA 135 had a thickness of 0.008 inches (0.0203 cm) an outer diameter of 3.980 inches (10.109 cm), and each electrode had a diameter of 3 inches (7.62 cm). The MEA 135 was surrounded on opposite sides by an oxygen flow field 144 and a hydrogen flow field 146. The MEA 135 was supported on the side of the oxygen flow field 144 by a screen support structure 152, and was supported on the side of the hydrogen flow field 146 by a screen support structure 154. The support structures 152, 154 each had a diameter of 2.938 inches (7.463 cm) and a thickness of 0.01 inches (0.0254 cm). A 70 durometer Viton® gasket 171 was disposed between a cell endplate 165 and a cell storage area 148 of oxygen flow field 144. At the opposite side of the cell 132, a 70 durometer Viton® gasket 170 was disposed between a cell separator 164 and a cell storage area 150 of hydrogen flow field 146. Further, to maintain compression of the flow fields 144, 146 with the respective oxygen and hydrogen electrodes of the MEA 135, a sponge rubber pressure pad was disposed between the flow field 144 and the cell endplate 165 and a sponge rubber pressure pad was disposed between the flow field 146 and the cell separator 164. The collective components of the cell 132, as well as components of adjacent cells (not shown), were maintained in position by a pair of guide pins 176.

Figure 4:
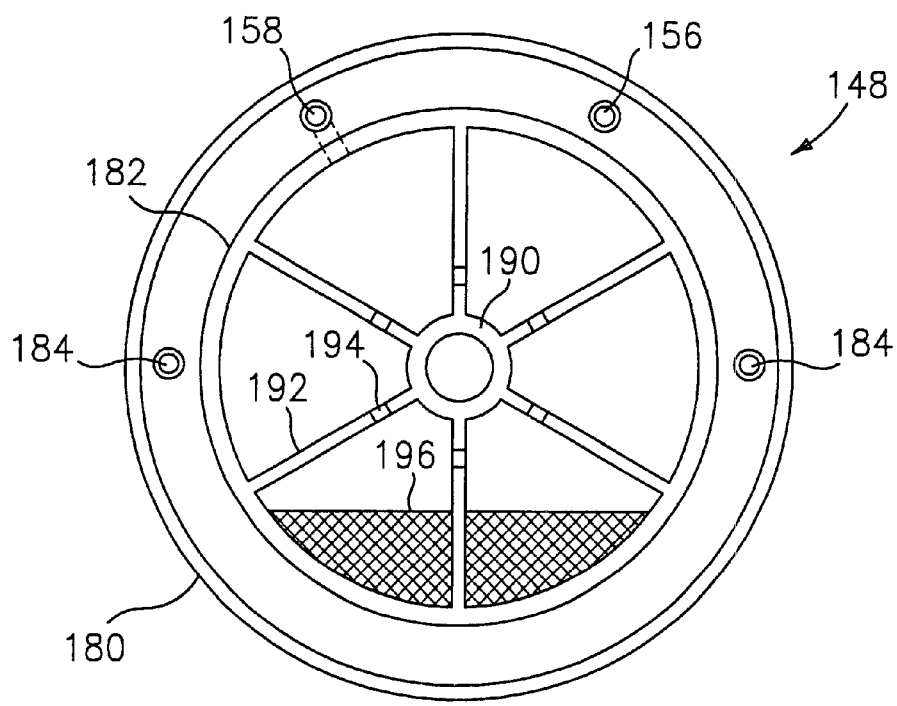
FIG. 4 is a cross sectional view of the cell assembly shown in FIG. 3 through lines 4–4.

Referring also to FIG. 4, the cell storage area 148 is detailed. The cell storage area 150 (FIG. 3) was similar to the cell storage area 148. The storage area 148 was 0.5 inches thick (1.27 cm) and comprised an outer portion 180 and an inner portion 182 that was formed of polycarbonate. A port 158 provided fluid communication between the storage area 148 and the corresponding storage areas in sequential cells. Likewise, a port 156 was in fluid communication with the hydrogen storage area 146 and the corresponding storage areas in sequential cells. The outer portion 180 and the inner portion 182 were configured with suitable lips to support the gasket 171, which was positioned between the outer portion 180 and inner portion 182 on one side, and the cell endplate 165 (or a cell separator where the cell was not on the end of the stack) on the opposite side. A pair of bosses 184 was positioned between the outer portion 180 and the inner portion 182 generally to support the guide pins 176. The inner portion had an outer diameter of 3.125 inches (7.938 cm) and in inner diameter of 3 inches (7.62 cm), and the outer portion had an outer diameter of 3.98 inches (10.109 cm) and in inner diameter of 3.87 inches (9.83 cm).

The inner portion 182 comprised a central hub 190 having a plurality of baffles 192 radiating from the hub 190 to the inner wall of the inner portion 182. The central hub 190 was configured to allow electrical connection with a centrally disposed electrical connection similar to the electrical connection 42. The baffles defined separate regions that were each in fluid communication with the MEA 135 through the screen support structure 152, with each other by openings 194 formed on each baffle 192.

A quantity of water (totaling 16 milliliters per cell) was introduced through the port 158 and maintained within the storage area 148. The electrochemical cell system was maintained such that the direction of the working fluids was horizontal, thus a water pool 196 was stored within the lower sections of the inner portion 182 generally separated by baffles 192.

The total hydrogen capacity of the system was 39.8 cubed inches (0.652 liters), measured at standard temperature and pressure. The total oxygen capacity of the system was 20.5 cubed inches (0.336 liters) measured at standard temperature and pressure. Note that these capacities included the total capacities of the respective cell storage areas 148, 150, and further included the capacities of the storage areas similar to the system storage areas 60 and 62 described above with respect to FIG. 2. For example, the system included a system hydrogen storage area of 16.39 cubed inches (0.27 liters).

The cell system was tested for structural integrity prior to operation. The testing included hydrostatic pressurization to 100 pounds per square inch (psi) on both sides of the cell stack.

During operation in electrolyzer mode, the water from pool 196 was electrolyzed into hydrogen and oxygen. Approximately 31 watts of power (2.1 amperes at 15.1 volts) was applied to the cell stack and the water was electrolyzed into hydrogen and oxygen. The hydrogen had a pressure of 10 psi, and the oxygen had a pressure of 9.1 psi.

The electrochemical cell system was reversed, and the stored hydrogen was converted into electricity to power a pump. Specifically, the pump required a voltage of 12 volts, and a total power requirement of 11.9 watts. The electrochemical cell system successfully operated the pump for over 30 minutes.

The electrochemical cell system herein enables remote use of electrochemical cells due to its simplified design, which eliminates or minimizes the need for pumps, external storage and supply tanks, and other peripheral equipment. Although this system can readily be connected to such external equipment, the external equipment is not required. Furthermore, this system is regenerable, which enables electricity generation during the night with recharging during the day via one or more photovoltaic cells, for example.

While preferred embodiments have been shown and described, various modifications and substitutions may be made thereto without departing from the spirit and scope of the invention. Accordingly, it is b be understood that the present invention has been described by way of illustrations and not limitation.

What is claimed is:

1. An electrochemical cell system, comprising:
    at least one electrochemical cell comprising a membrane electrode assembly including a first electrode, a second electrode, and a membrane disposed between and in intimate contact with the first electrode and the second electrode; and
    a vessel disposed around the membrane electrode assembly, the vessel defining a first flow field from which a fuel is fed, the first flow field being adjacent to the first electrode and distal from the second electrode, at least a portion of a first storage area disposed in fluid communication with the first flow field, and a third storage area disposed in fluid communication with the first storage area through a first fluid port, and a second flow field adjacent to the second electrode, at least a portion of a second storage area disposed in fluid communication with the second flow field, and a fourth storage area disposed in fluid communication with the second storage area through a second fluid port.

2. The electrochemical cell system as in claim 1, wherein said first storage area further comprises an area between a first electrochemical cell end plate and a first wall of said vessel;
    said second storage area further comprises an area between a second electrochemical cell end plate and a second wall of said vessel.

3. A regenerative fuel cell system, comprising:
    a membrane electrode assembly comprising a membrane and a first electrode and a second electrode disposed at opposing sides of said membrane and in intimate contact with said membrane;
    a first flow field adjacent to said first electrode;
    a second flow field adjacent to said second electrode;
    a first cell storage area in fluid communication with said first flow field, said first cell storage area being configured to deliver a fuel therefrom to said first electrode;

a second cell storage area in fluid communication with said second flow field;

a first system storage area disposed in fluid communication with said first cell storage area via a first fluid port; and a second system storage area disposed in fluid communication with said second cell storage area via a second fluid port.

4. The regenerative fuel cell system of claim 3, further comprising a vessel disposed around said membrane electrode assembly, said first and second flow fields, said first and second cell storage areas, and said first and second system storage areas.

5. The regenerative fuel cell system of claim 3, further comprising a first support structure disposed within said first flow field and a second support structure disposed within said second flow field.

6. The regenerative fuel cell system of claim 3, further comprising external ports disposed at said first system storage and said second system storage.

* * * * *